(12) United States Patent
Brauer

(10) Patent No.: US 9,996,754 B2
(45) Date of Patent: Jun. 12, 2018

(54) APPARATUS AND METHOD FOR PROVIDING ATTITUDE REFERENCE FOR VEHICLE PASSENGERS

(71) Applicant: B/E Aerospace, Inc., Wellington, FL (US)

(72) Inventor: R. Klaus Brauer, Seattle, WA (US)

(73) Assignee: B/E Aerospace, Inc., Wellington, FL (US)

(*) Notice: Subject to any disclaimer, the term of this patent is extended or adjusted under 35 U.S.C. 154(b) by 0 days. days.

(21) Appl. No.: 14/645,526

(22) Filed: Mar. 12, 2015

(65) Prior Publication Data

US 2015/0363656 A1 Dec. 17, 2015

Related U.S. Application Data

(60) Provisional application No. 62/011,886, filed on Jun. 13, 2014.

(51) Int. Cl.
*H04N 7/18* (2006.01)
*G06K 9/00* (2006.01)
*B64D 11/00* (2006.01)

(52) U.S. Cl.
CPC ...... *G06K 9/00791* (2013.01); *B64D 11/0015* (2013.01); *H04N 7/181* (2013.01)

(58) Field of Classification Search
CPC .................... B61D 11/0051; B64D 2011/0061
See application file for complete search history.

(56) References Cited

U.S. PATENT DOCUMENTS

| 5,611,503 | A | 3/1997 | Brauer |
| 6,317,127 | B1* | 11/2001 | Daily ...................... G06T 15/10 345/629 |
| 7,088,310 | B2* | 8/2006 | Sanford ........................... 345/7 |
| 7,128,705 | B2* | 10/2006 | Brendley ............... A61M 21/00 348/148 |
| 2002/0093564 | A1* | 7/2002 | Israel ........................... 348/145 |
| 2004/0217234 | A1* | 11/2004 | Jones et al. ................ 244/118.5 |
| 2004/0217978 | A1* | 11/2004 | Humphries ................... 345/649 |

(Continued)

FOREIGN PATENT DOCUMENTS

EP 0 913 325 B1 6/2004

OTHER PUBLICATIONS

International Search Report and Written Opinion of corresponding International Application No. PCT/US2015/020075; mailed May 21, 2015; 11 pages.

*Primary Examiner* — Rebecca Volentine
(74) *Attorney, Agent, or Firm* — Donna P. Suchy

(57) ABSTRACT

An apparatus adapted to provide visual attitude reference to occupants seated in an inboard area of a cabin of a vehicle, that includes at least one interior partition positioned in the cabin in proximity to the occupants and at least one video camera mounted on the vehicle for capturing an electronic image of an environment exterior to the vehicle. At least one video monitor is adapted to serve as a virtual window mounted on the at least one interior partition in a substantially vertical and substantially parallel direction relative to a direction of forward travel of the vehicle in viewing proximity to the occupant, and further adapted to receive the electronic image from the at least one video camera and provide to the occupant an image of the environment external to the vehicle to the occupant.

14 Claims, 6 Drawing Sheets

(56) References Cited

U.S. PATENT DOCUMENTS

| | | | |
|---|---|---|---|
| 2005/0278753 A1* | 12/2005 | Brady et al. | 725/76 |
| 2008/0111832 A1* | 5/2008 | Emam | G02B 27/017 345/633 |
| 2010/0060739 A1* | 3/2010 | Salazar | B64D 11/0015 348/148 |
| 2010/0157063 A1 | 6/2010 | Basso et al. | |
| 2010/0188506 A1 | 7/2010 | Dwyer et al. | |
| 2012/0325962 A1 | 12/2012 | Barron | |
| 2013/0169807 A1* | 7/2013 | de Carvalho | H04N 7/183 348/144 |
| 2014/0160285 A1* | 6/2014 | Barrou et al. | 348/144 |
| 2014/0173669 A1* | 6/2014 | Coto-Lopez | 725/76 |
| 2015/0077337 A1* | 3/2015 | Coto-Lopez | B64D 11/0015 345/156 |
| 2015/0138449 A1* | 5/2015 | Rawlinson et al. | H04N 21/41422 |

* cited by examiner

APPARATUS AND METHOD FOR PROVIDING ATTITUDE REFERENCE FOR VEHICLE PASSENGERS

CROSS REFERENCE TO RELATED APPLICATIONS

This Application is a non-provisional application which claims priority to, the benefit of, and expressly incorporates the entirety of U.S. Provisional Application having Ser. No. 62/011,866 filed on Jun. 13, 2014.

TECHNICAL FIELD AND BACKGROUND OF THE INVENTION

The invention relates generally to the field of vehicular travel and more particularly to a video system and apparatus which informs one or more passengers seated in an enclosed windowless suite in a vehicle of the vehicle's attitude and changes in vehicle attitude (e.g. pitching nose up or nose down, or yawing or rolling to the right or left.) Such windowless suites are now found in luxury long haul aircraft cabin suites of commercial aircraft.

It has long been known that airline passengers seated in window seats report experiencing higher comfort levels than passengers in other cabin areas. See U.S. Pat. No. 5,611,503, particularly FIG. 4. While there may be several reasons for this higher reported comfort level, psychological studies have shown that enabling passengers to be correctly oriented in space is an important contributor to passenger comfort. While some passengers experience acute motion sickness when deprived of visual references informing them of changes in vehicle attitude, a majority of airline passengers experience only a somewhat diminished comfort, the origin of which is unknown to them, when experiencing properly-coordinated maneuvers of a commercial airplane without a visual reference informing them of changes in airplane attitude.

Forward looking and downward looking "landscape" cameras displaying images on a video screen generally forward of the passenger are well known. Static airplane mockups incorporating video screens in lieu of windows are also known. In this and similar known applications, a single image has been replicated on all screens on the same side of the mockup.

Forward looking landscape cameras do not provide a reliable attitude reference during takeoff maneuvers because the nose of the aircraft is quickly pointed skyward, leaving no observable horizon. As a result, the disappearance of the horizon as the airplane rotates on takeoff can be disorienting to passengers. Downward looking cameras also do not provide an intuitive attitude reference to the passengers. Furthermore, the video screen displaying these images serves a variety of information and entertainment purposes and is rarely turned to the camera mode, rendering it unlikely to relieve motion-oriented discomfort resulting from a cause unrecognized by the passenger.

While they have been used in static mockups in which motion oriented discomfort is not an issue, emulating a row of aircraft windows with video monitors has never been considered sufficiently attractive for use in an airplane to justify developing and flight testing such a system. For a typical airplane cabin with many occupants and many monitors emulating windows, no viable alternative has been found to repeating the same image on each monitor down the length of a side of the cabin. When an airplane is climbing, repeating the same image in each monitor along a row of windows presents the image of a level flight over a sawtooth landscape. Any such perceived attitude reference is ambiguous or confusing. When an airplane is rolling, monitors farther from the viewer subtend a smaller vertical field of view. Accordingly, to each individual viewer the rear of the airplane appears to be rolling more quickly than the front of the airplane, an appearance more likely to induce motion sickness than alleviate it. The present invention avoids these problems by restricting system use to a single point of view, and providing mathematical guidance on both the orientation and field of view for each image shown.

To provide an intuitive reference which does not require passenger training to be effective, the present invention emulates the windows typically found in commercial aircraft in which passengers seated in enclosed cabins can be expected to have experienced on previous flights. There is no need for passengers to focus their attention on the video monitors of the present invention to be provided the desired attitude reference. It is sufficient that they are subconsciously informed of changing airplane attitude through their peripheral vision.

The present invention also includes a video reference system for a single viewer in a private cabin in an aircraft, ship or other vehicle, the motion of which might induce motion sickness or motion-related discomfort.

SUMMARY OF THE INVENTION

It is therefore an object of the present invention to provide an apparatus and method for providing attitude reference information to vehicle passengers.

It is another object of the invention to provide an apparatus and method for providing attitude reference information to aircraft passengers without access to direct visual attitude reference, such as passengers in private suites.

These and other objects and advantages of the invention are achieved by providing an apparatus adapted to provide visual attitude reference to occupants seated in an inboard area of a cabin of a vehicle, that includes at least one interior partition positioned in the cabin in proximity to the occupants and at least one video camera mounted on the vehicle for capturing an electronic image of an environment exterior to the vehicle. At least one video monitor is adapted to serve as a virtual window mounted on the at least one interior partition in a substantially vertical and substantially parallel direction relative to a direction of forward travel of the vehicle in viewing proximity to the occupant, and further adapted to receive the electronic image from the at least one video camera and provide to the occupant an image of the environment external to the vehicle to the occupant.

According to one embodiment of the invention, the cabin is without transparent cabin windows that provide a view of the actual environment external to the vehicle.

According to another embodiment of the invention, the cabin includes transparent cabin windows that provide a view of the actual environment external to the vehicle to occupants seated in proximity to the transparent cabin windows but not to occupants in proximity to the at least one interior partition.

According to one embodiment of the invention, an apparatus provides attitude reference to one or more passengers in an enclosed windowless cabin of a vehicle. The apparatus includes one or more video monitors mounted substantially vertical and substantially parallel to a direction of forward travel of the vehicle. The apparatus includes one or more video cameras positioned in an outer wall of the vehicle and arranged to capture video of the view of the environment external to the vehicle that is generally perpendicular to the direction of forward travel of the vehicle. The apparatus may further include a computer connecting the one or more video cameras with the one or more video monitors. The apparatus may yet further include one or more sensors configured to provide occupant location data to the computer.

According to such an embodiment, the video cameras and the video monitors are positioned at substantially the same lateral position along a longitudinal length of the vehicle. The computer utilizes occupant location data to determine the video displayed on the monitors. Further, each of the monitors, based on the occupant location data as determined by the computer, displays a different image oriented in a direction substantially perpendicular to an occupant's line of sight to the monitor displaying that image.

According to another embodiment of the invention, the apparatus may include at least one video monitor mounted substantially vertical and substantially parallel to a direction of forward travel of the vehicle and in viewing proximity to the occupant and adapted to provide a lateral view of an environment external to the vehicle to the occupant.

According to another embodiment of the invention, the video monitor or monitors may be positioned in lateral proximity to a forward-facing occupant.

According to one embodiment of the invention, the sensors which provide the occupant location data are selected from the group consisting of: sensors monitoring the position of the seat supporting the occupant; an optical system designed to locate the occupant's head; and a head rest sensor monitoring the position of the occupant's head on a head rest of the seat.

According to another embodiment of the invention, the different image displayed on each of the monitors provides a substantially same field of view to the occupant of the enclosed windowless cabin as would be experienced by a similarly situated occupant of an enclosed cabin having windows.

According to one embodiment of the invention, multiple monitors are provided, and display a different image oriented in a direction substantially perpendicular to an occupant's line of sight to the monitor displaying that image.

According to one embodiment of the invention, the number of monitors is equal to three.

According to one embodiment of the invention, each image has a vertical angular field of view substantially equal to the vertical angle subtended by the corresponding monitor from an occupant's eye position.

According to one embodiment of the invention, the line of sight originates at an occupant's eye position while seated in a position required for taxi, takeoff and landing.

According to one embodiment of the invention, the line of sight originates at an occupant's eye position as estimated using sensors monitoring the position of the seat supporting the occupant.

According to one embodiment of the invention, the line of sight originates at an occupant's eye position as estimated using an optical system designed to locate the occupant's head.

According to one embodiment of the invention, an enclosed aircraft cabin adapted to seat a single individual or two individuals side-by-side is provided, and incorporates the claimed video system.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
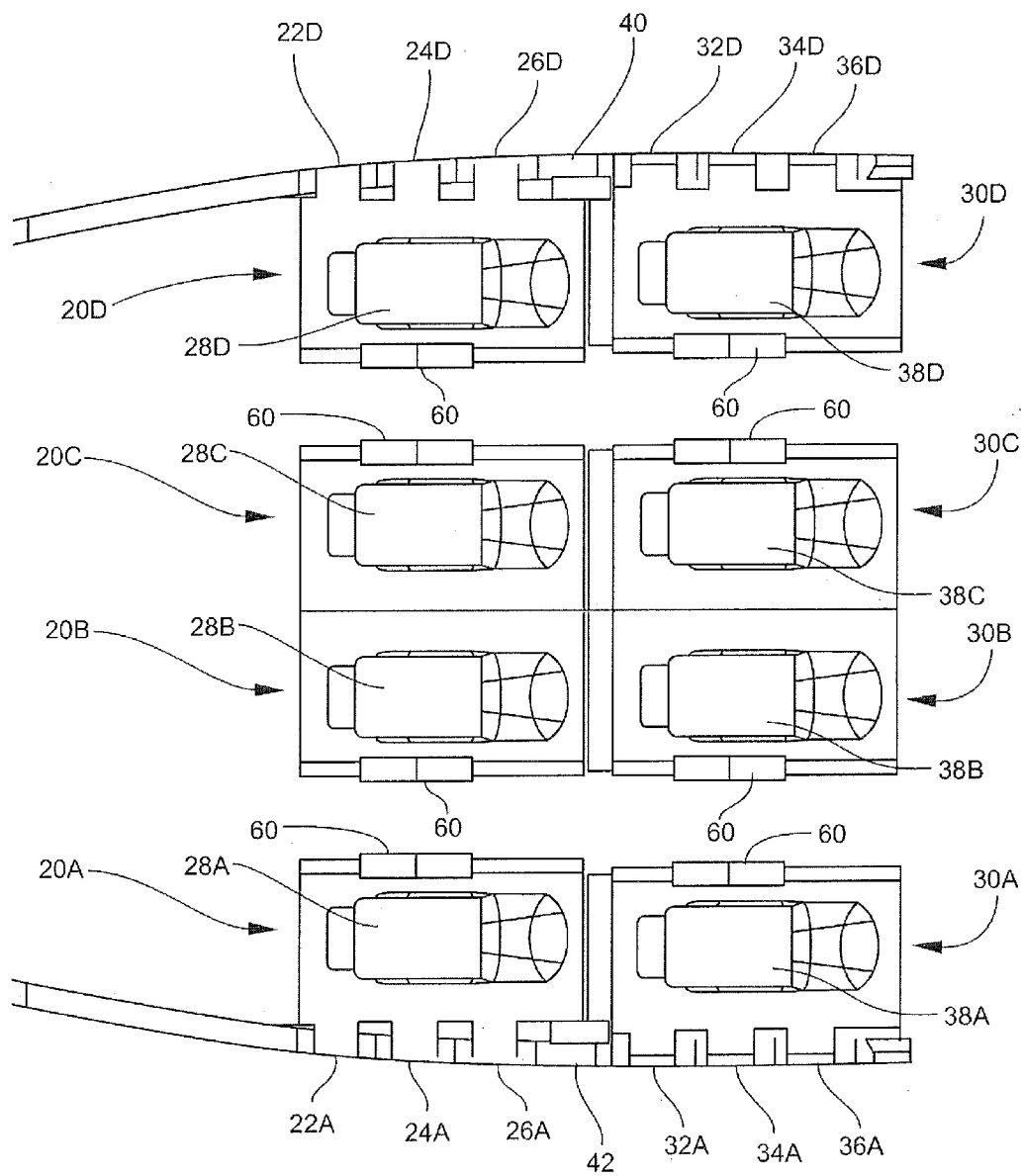
FIG. 1 is a plan view of a prior art aircraft interior with fully enclosed individual suites.

Referring now to the drawings, FIG. 1 illustrates a prior art aircraft cabin with enclosed individual suites 20A, 20B, 20C, 20D, 30A, 30B, 30C, 30D. Each of the suites is accessible via door 60 for each suite. Note the blocked windows 40, 42. Passengers in suites 20A, 20D, 30A, and 30D have direct window access via windows 22A, 24A, 26A, 22D, 24D, 26D, 32A, 34A, 36A, 32D, 34D, and 36D, respectively. However, in this interior environment of FIG. 1, the passengers in suites 20B, 20C, 30B and 30C are without any visual attitude reference.

Figure 3:
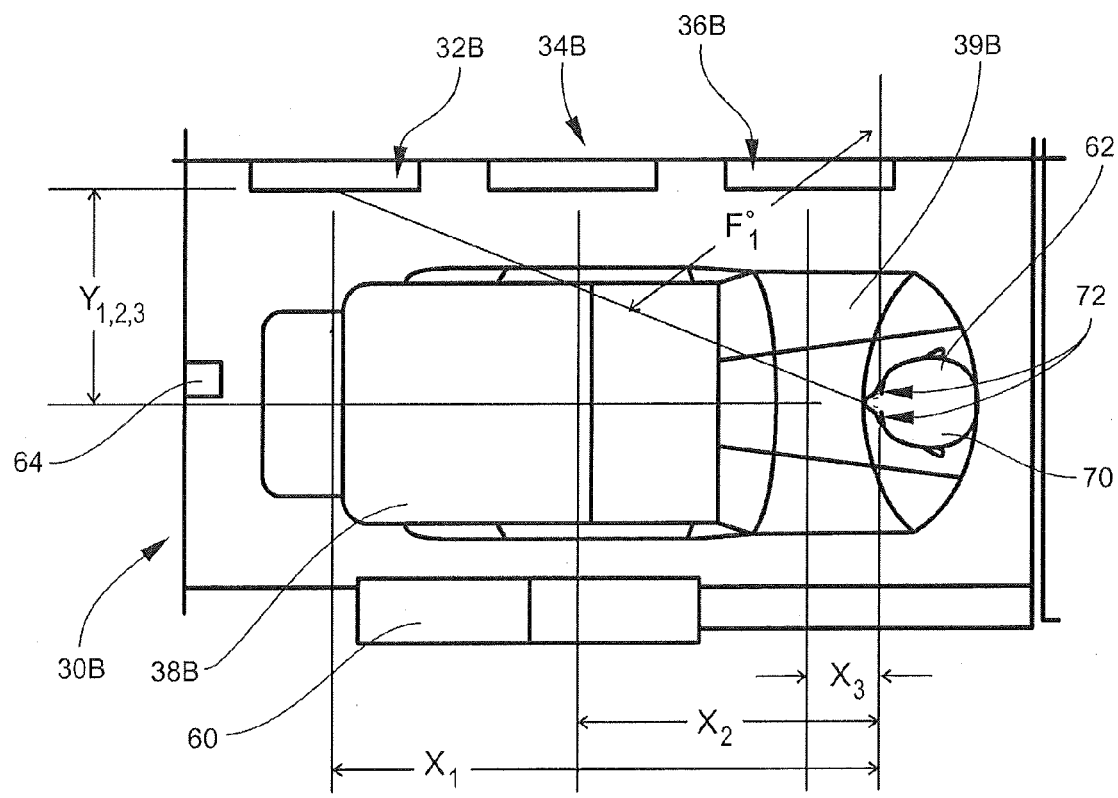
FIG. 3 is an enlarged plan view of a single one of the individual enclosed suites shown in FIG. 2; and attitude reference information to aircraft passengers without access to direct visual attitude reference.
Figure 4:
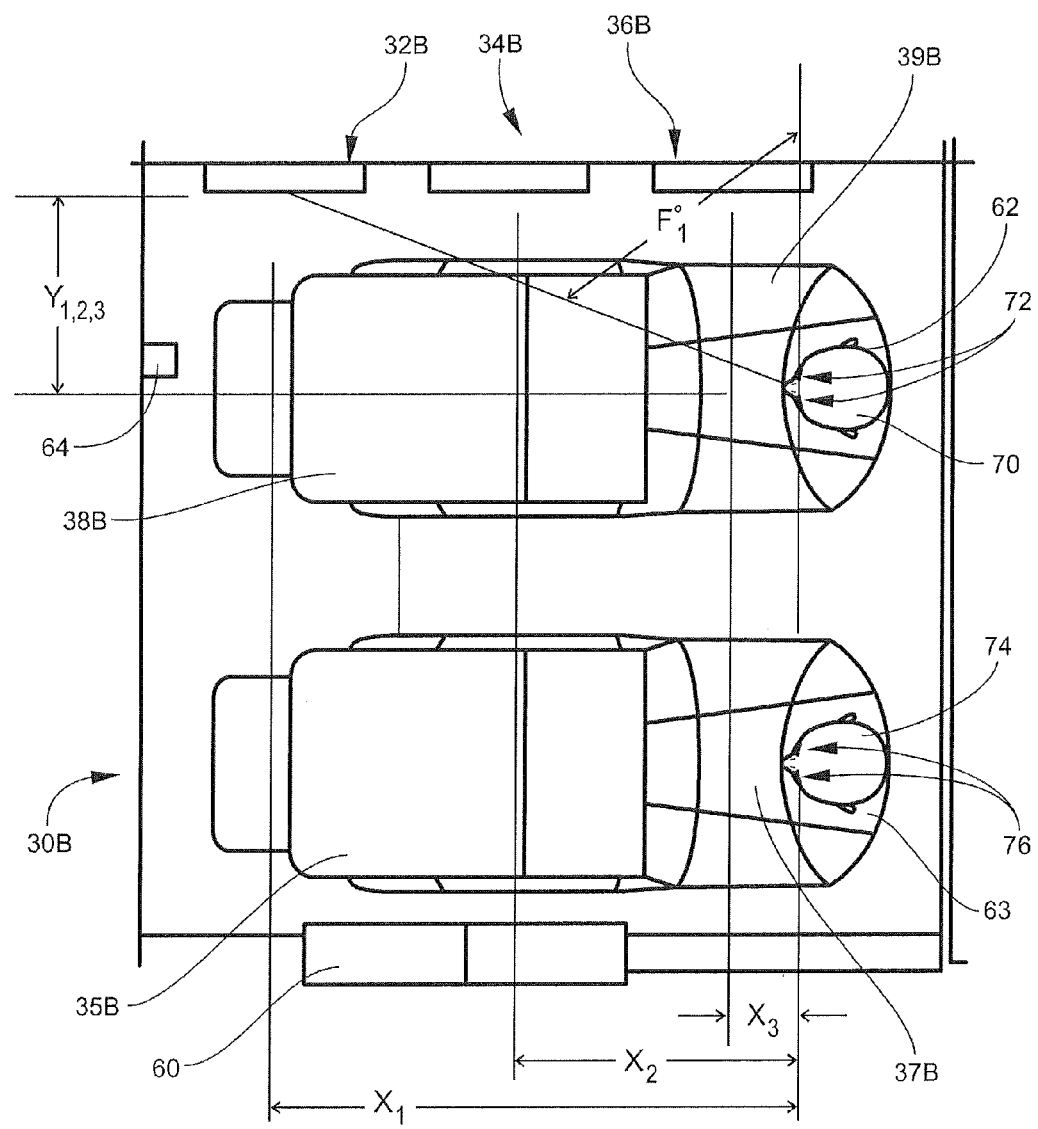
FIG. 4 is an enlarged plan view of a single one of the individual enclosed suites shown in FIG. 2 but including a second seat; and attitude reference information to aircraft passengers without access to direct visual attitude reference.
Figure 5:
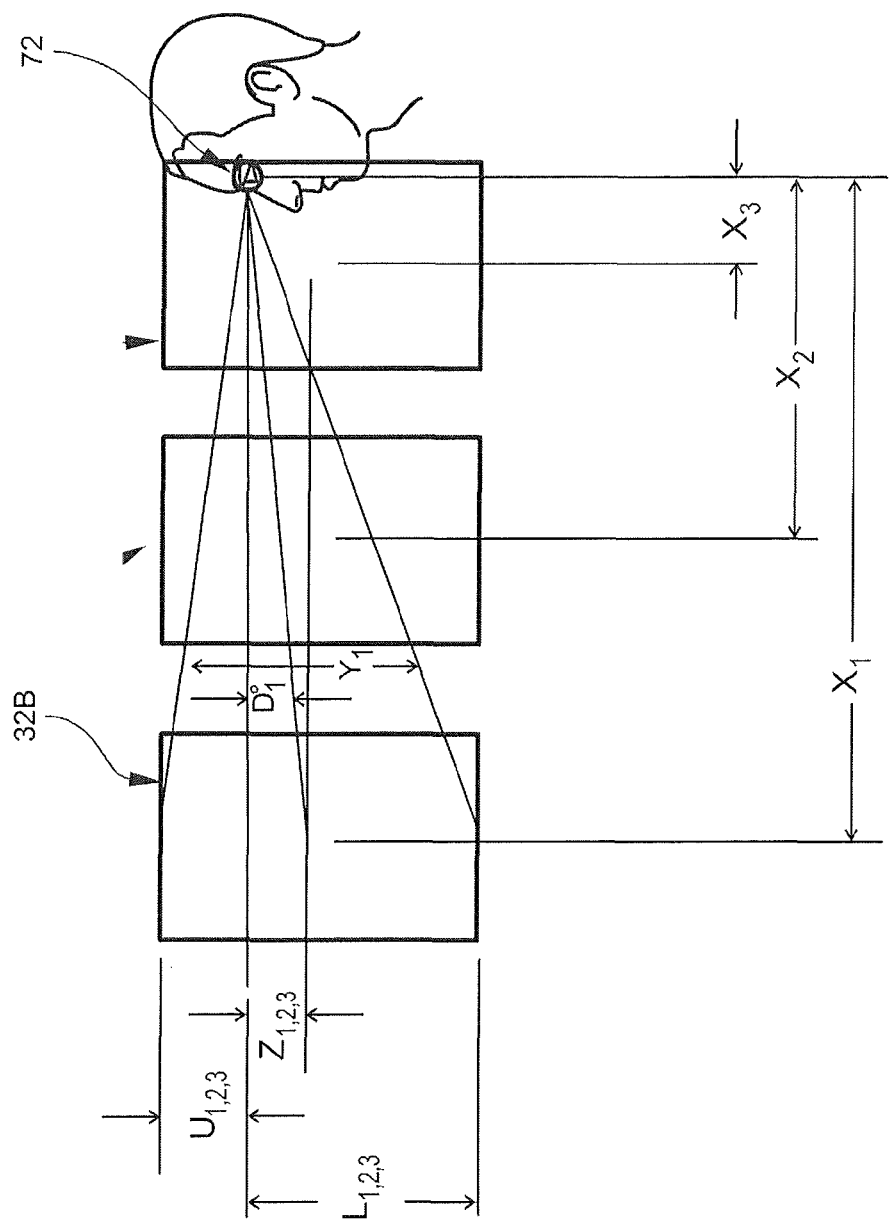
FIG. 5 is a side elevation view showing respective monitor and eye elevation positions for the individual enclosed suite of FIGS. 2, 3, and 4.
Figure 6:
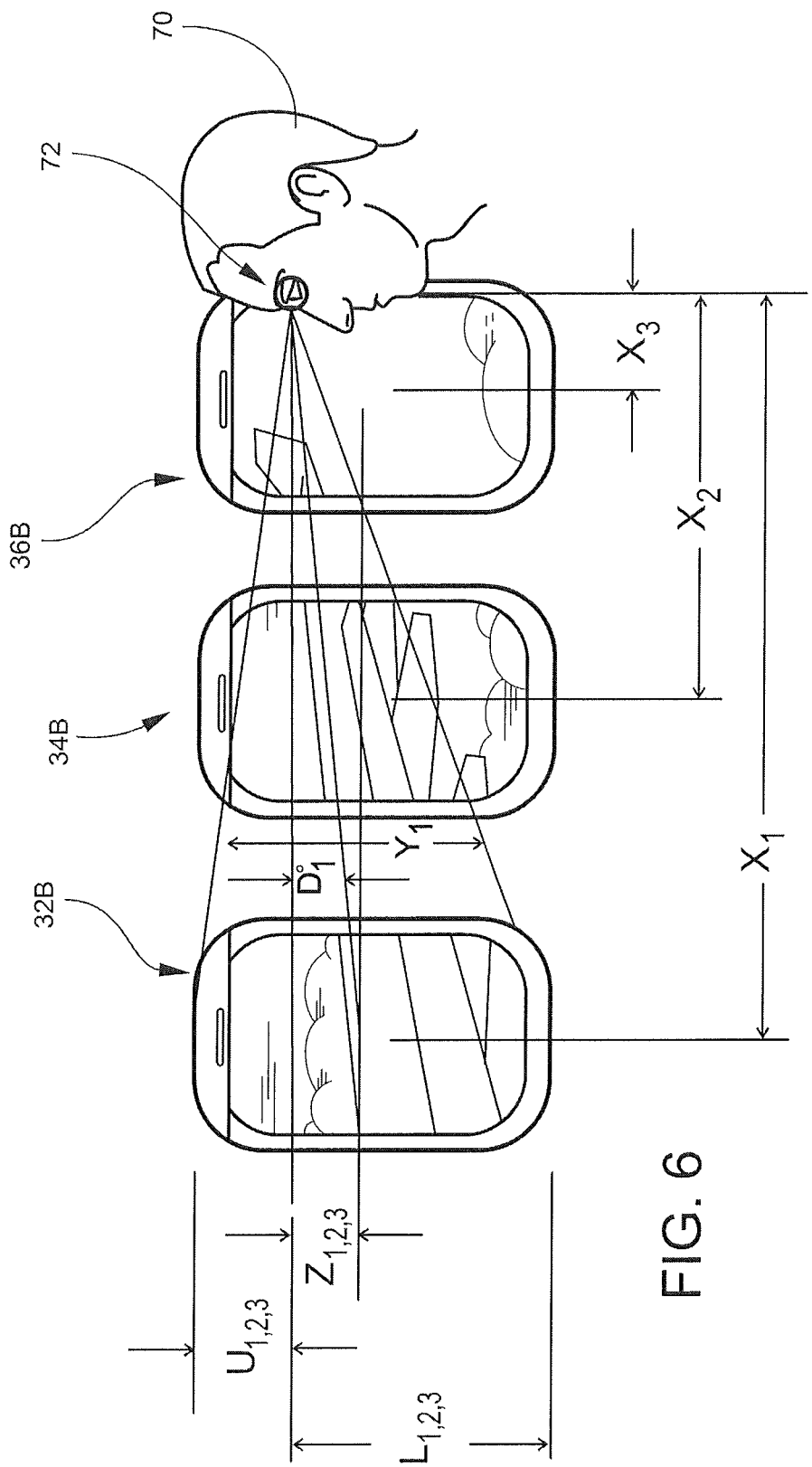
FIG. 6 is a side elevation view showing respective monitor and eye elevation positions for the individual enclosed suite of FIGS. 2, 3, and 4 and highlighting the replication of windows via the respective monitors.

In accordance with a preferred embodiment of the invention as shown in FIGS. 2, 3, 4, 5, and 6, video monitors 22B, 24B, 26B, 22C, 24C, 26C, 32B, 34B, 36B, 32C, 34C, and 36C are provided, as indicated, for passengers seated in enclosed suites 20B, 20C, 30B, and 30C, respectively, and, as shown in FIGS. 5 and 6, the orientation of the monitors emulates the orientation of standard aircraft passenger windows. This orientation takes advantage of the occupant's 70 experience with "real" windows, such as real windows 22A, 24A, 26A, 32A, 34A, 36A, 22D, 24D, 26D, 32D, 34D, and 36D, to provide an intuitive attitude reference. Replication of this experience is depicted in FIG. 6. The video monitors, 22B, 24B, 26B, 22C, 24C, 26C, 32B, 34B, 36B, 32C, 34C, 36C, of the present invention 10 are intended to serve the single purpose of providing an external view (as shown in FIG. 6) and attitude reference and should not, therefore, also be used to provide informational or entertainment content.

To provide high resolution images to each monitor, 22B, 24B, 26B, 22C, 24C, 26C, 32B, 34B, 36B, 32C, 34C, 36C, a preferred embodiment of the invention employs a separate camera located at camera position 50, 52, for each viewing angle. These cameras are positioned 50, 52 in unblocked windows 44, 46 respectively. (These windows are blocked in prior art—see FIG. 1). It is understood that distinct images with the desired viewing angles can be extracted electronically from a single image with a field of view wide enough to encompass the desired viewing angles. However, each of these distinct images would comprise such a small fraction of the original image that the resulting resolution would be poor.

Figure 2:
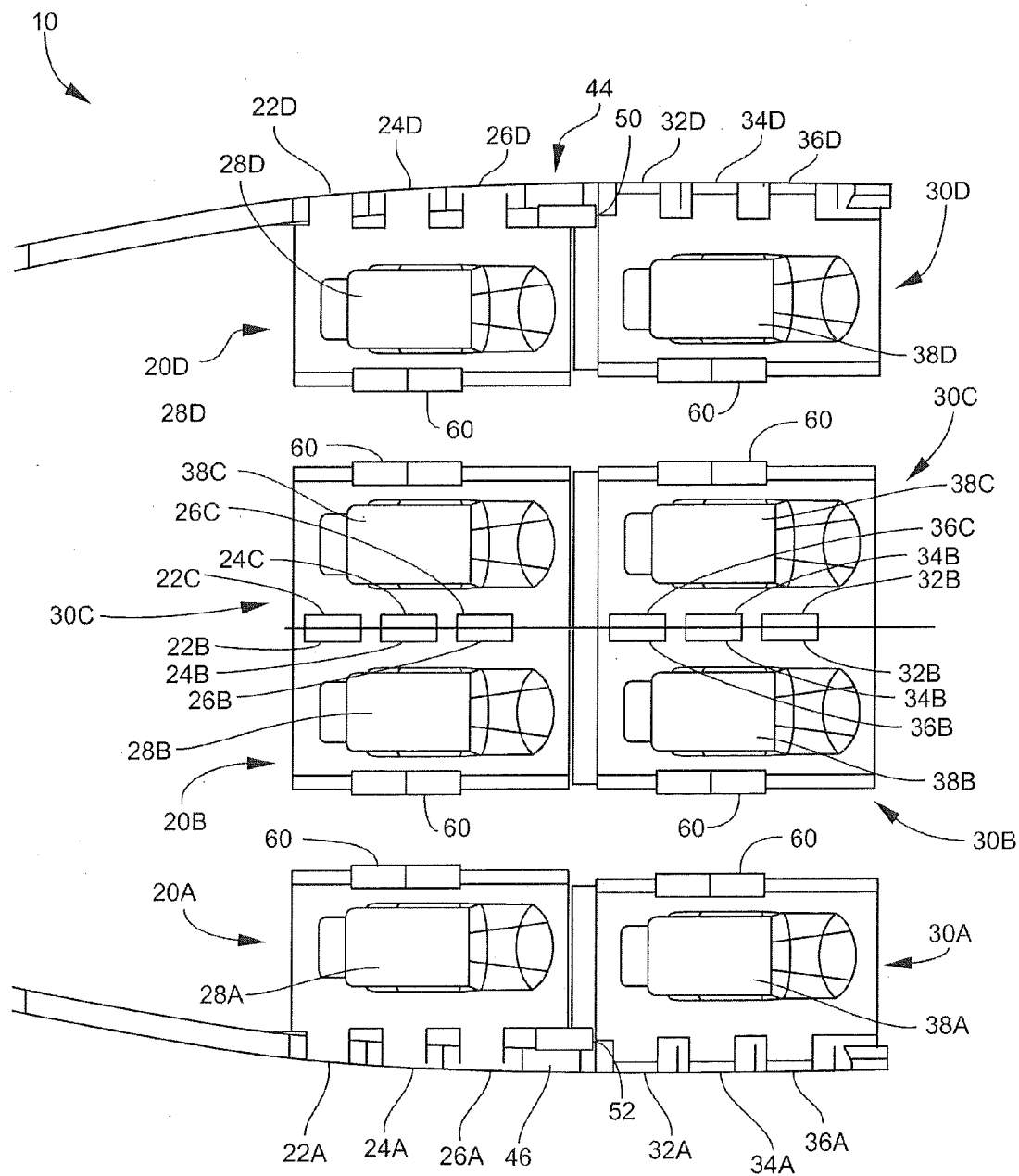
FIG. 2 is a plan view of an embodiment of the present invention, providing attitude reference information to aircraft passengers without access to direct visual attitude reference.

As shown in FIGS. 3, 4, 5 and 6, the orientation of a camera image for the present invention can be D° (downward) relative to a horizontal plane and F.° (forward) relative to a transverse plane. The angle values D° and F.° will be different for each monitor having a different relationship to the viewer, which can be represented as $D_1°$, shown in FIGS. 5 and 6, and $F_1°$ shown in FIGS. 3 and 4, for the forward-most monitor in a cabin, $D_2°$ and $F_2°$ for the second forwardmost monitor in a cabin and so forth. In FIG. 2 three individual monitors are shown in the suites 20B, 20C, 30B, 30C emulating the three standard windows provided in the suites, 20A, 20D, 30A, 30D. If the internal configurations of the interior suites 20B, 20C, 30B, and 30C provide the same relationship between the occupant's 70 eye position 72 and monitor locations, as in suites 20B and 30B in FIG. 2, $D_1°$, $D_2°$, $D_3°$, $F_1°$, $F_2°$ and $F_3°$ are the same for both suites and the corresponding monitors 22B, 24B, 26B, 32B, 34B, and 36B can display the same respective images.

It is sufficient for the purpose of the present invention to consider the viewer as having a notional single eye 72 positioned between his or her eyes, where:

X is the forward distance from the viewer's 70 eye 72 to the center of the respective monitor 32B, 34B, 36B, as illustrated in FIGS. 3-6;

Y is the transverse distance from the viewer's 70 eye 72 to the center of the respective monitor 32B, 34B, 36B, as illustrated in FIGS. 3 and 4;

Z is the height of eye 72 above the center of the respective monitor, 32B, 34B, 36B, as illustrated in FIGS. 5 and 6; and R is the horizontal distance from the occupant's eye to the center of the monitor, according to the formula:

$$R = \sqrt{(X^2 + Y^2)}$$

D° in FIG. 5 can be calculated as D°=arctangent(Z/R); and

F.° in FIG. 3 can be calculated as F.°=arctangent(X/Y).

The field of view V° in FIGS. 5 and 6, when measured as the viewing angle presented on the video monitor, 32B, 34B, 36B, from the upper edge of the monitor, 32B, 34B, 36B, to the lower edge of the monitor, 32B, 34B, 36B, is calculated as the sum of the angle above eye 72 height to the upper edge of the monitor, 32B, 34B, 36B, and the angle below eye 72 height to the lower edge of the monitor, 32B, 34B, 36B, where:

U is the height of the upper edge of the monitor, 32B, 34B, 36B, above the occupant's eye as illustrated in FIG. 5, and L is the height of the eye 72 above the lower edge of the monitor, 32B, 34B, 36B; and V° can be calculated as V°=arctangent(U/R)+arctangent (L/R).

To use simple lens assemblies, the preferred embodiment of the invention employs a different camera/lens combination for each desired field of view. However, for reasons of maximizing parts commonality, the invention could employ for all cameras in the system a camera/lens combination optimized for the widest field of view required and reduce the field of view of the images electronically as required. While the present invention is particularly well suited to a single viewer 70, it will retain some effectiveness for two viewers seated in close proximity with eye 72 positions close to one another as might be found when a couple is seated together on a double seat as shown in FIG. 4.

The view through a typical aircraft window changes in both angle and field of view with changes in the eye 72 position of the viewer. For example, as the observer 70 moves aft relative to a window, the view shifts to a more forward-looking view. Similarly, as the viewer moves closer to a window, the field of view through the window defines a larger angle. To provide a visual reference that is consistent with the vehicle's maneuvers, a monitor, 32B, 34B, 36B, emulating a window must display an image that approximates the view the observer would see if the monitor were actually a window. For this reason both the orientation and the field of view of the camera image for the video monitor, 32B, 34B, 36B, must be determined based on the eye position 72 of the viewer relative to the video monitor, 32B, 34B, 36B.

Accordingly, if multiple video monitors, 32B, 34B, 36B, emulating the row of windows (such as 32D, 34D, 36D) commonly found in an airplane are provided to a single viewer, each of the monitors must present a different image, with the orientation and field of view of each of the images being determined by the viewer's 70 eye position 72 relative to that respective monitor, 32B, 34B, 36B.

According to one embodiment of the invention, the viewer's 70 eye position 72 is calculated using the headrest 62 position of the viewer's seat 38B when in the upright position used during taxi takeoff and landing (TTL). This eye position 72 can be calculated as the seated eye height above the compressed seat cushion and the head length forward of the head rest. In addition to its simplicity of execution, the present preference for this method derives from the fact that the seated viewer 70 is obliged to have the seat in the TTL position during the periods of flight when the airplane is making the maneuvers likely to cause motion sickness or discomfort.

In an additional embodiment of the present invention, seat position sensors including, but not limited to, a recline position sensor, can be employed to estimate the viewer's eye position 72 when the viewer's seat 38B is not in the TTL position.

As a yet further embodiment of the present invention, as shown in FIGS. 3-4, a visual system 64 that recognizes and calculates the position of facial features of the occupant 70 such as is commonly used in range-finding cameras can be used to determine the viewer's eye position 72.

The foregoing explanations are not intended to limit the methods of estimating or determining the viewer's 70 eye position 72 for the present invention. F.°, D° and V° can be calculated as described above when using these or other methods of estimating or determining the viewer's 70 eye position 72 and images to be displayed on monitors modified by either mechanical, optical or electronic means to adjust F.°, D° and V° as required.

Viewing a monitor at an acute angle distorts the perceived image. As used in the present invention, particularly as the angle F.° increases, the image as viewed will appear compressed in the horizontal axis. This distortion can be adequately corrected by expanding the image in the horizontal axis by a factor equal to 1/cosine F.°. The preferred embodiment of the present invention does not correct this distortion because, when V° is calculated as above, the horizontal distortion does not impair the viewer's 70 perception of pitch changes or roll rate from the TTL position and, therefore, leaves the system's contribution to passenger 70 comfort unimpaired. The expansion of the image in the horizontal axis to correct the distortion when viewed from the TTL position would be objectionable in the cruise mode of flight, as the occupant 70 moves forward in the suite to dine or for other activities. If a mechanism were employed in the system to actively estimate the occupant's 70 changing eye 72 position and adjust F.°, D° and V° as required, such as those described above but not part of the presently preferred embodiment, a mathematical correction for the distortion such as expanding the image horizontally by 1/cosine F.° can be employed.

An apparatus and method for providing attitude reference for vehicle passengers according to the invention have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

What is claimed is:

1. An apparatus adapted to provide attitude reference to occupants in a cabin of a vehicle comprising:
   (a) a windowless suite positioned in the cabin having an opening and a plurality of interior partitions surrounding a seat;
   (b) a plurality of video cameras mounted on the vehicle in a same lateral position as the windowless suite for capturing electronic images of an environment exterior to the vehicle;
   (c) a plurality of video monitors adapted to serve as virtual windows mounted on the interior partitions in a vertical and parallel direction relative to a direction of forward travel of the vehicle in viewing proximity to the occupants, and further adapted to receive the electronic images from the plurality of video cameras and provide to respective occupants images of the environment external to the vehicle to the occupant;
   (d) a computer connecting the plurality of video cameras with the plurality of video monitors;
   (e) at least one sensor configured to provide occupant location data to the computer;
   (f) wherein the plurality of video monitors are positioned in spaced-apart relationship along a longitudinal length of one of the interior partitions of the windowless suite of the cabin of the vehicle;
   (g) wherein the computer utilizes occupant location data to determine the video images to be displayed on each of the plurality of monitors;
   (h) wherein each of the plurality of monitors, based on the occupant location data as determined by the computer, displays a different image oriented in a direction perpendicular to an occupant's line of sight to the monitor displaying that image;
   (i) wherein the line of sight originates at an occupant's eye position as estimated using sensors monitoring the position of the seat supporting the occupant, wherein the sensors are connected to the computer and provide the occupant location data to the computer; and
   (j) wherein the different image displayed on each of the plurality of monitors provides a same field of view to the occupant of cabin as would be experienced by a similarly situated occupant through a window positioned in a lateral spaced-apart relationship along a longitudinal length of the vehicle.

2. The apparatus of claim 1, wherein the plurality of video monitors are positioned in lateral proximity to the occupant.

3. The apparatus of claim 1, wherein each image has a vertical angular field of view equal to the vertical angle subtended by the corresponding monitor from the occupants' eye position.

4. The apparatus of claim 1, wherein the line of sight originates at the occupant's eye position while seated in a position required for taxi, takeoff and landing.

5. The apparatus of claim 3, wherein the occupant's eye position is estimated using an optical system designed to locate the occupant's head, wherein the optical system is connected to the computer and provides the occupant location data to the computer.

6. The apparatus of claim 3, wherein the occupant's eye position is estimated using a head rest sensor monitoring the position of the occupant's head on a head rest of the seat, wherein the head rest sensor is connected to the computer and provides the occupant location data to the computer.

7. The apparatus of claim 1, wherein the suite is designed to seat a pair of occupants side-by-side.

8. An apparatus adapted to provide attitude reference to occupants in a cabin of a vehicle comprising:
   (a) a windowless suite positioned in the cabin having an opening and a plurality of interior partitions surrounding a seat;
   (b) a plurality of video cameras mounted on the vehicle in a same lateral position as the windowless suite for capturing electronic images of an environment exterior to the vehicle;
   (c) a plurality of video monitors adapted to serve as virtual windows mounted on the interior partitions in a vertical and parallel direction relative to a direction of forward travel of the vehicle in viewing proximity to the occupants, and further adapted to receive the electronic images from the plurality of video cameras and provide to respective occupants images of the environment external to the vehicle to the occupant;
   (d) a computer connecting the plurality of video cameras with the plurality of video monitors;
   (e) at least one sensor configured to provide occupant location data to the computer;
   (f) wherein the plurality of video monitors are positioned in spaced-apart relationship along a longitudinal length of one of the interior partitions of the windowless suite of the cabin of the vehicle;
   (g) wherein the computer utilizes occupant location data to determine the video images to be displayed on each of the plurality of monitors;
   (h) wherein each of the plurality of monitors, based on the occupant location data as determined by the computer, displays a different image oriented in a direction perpendicular to an occupant's line of sight to the monitor displaying that image;
   (i) wherein the line of sight originates at an occupant's eye position as estimated using a head rest sensor monitoring the position of the occupant's head on a head rest of the seat, wherein the head rest sensor is connected to the computer and provides the occupant location data to the computer; and
   (j) wherein the different image displayed on each of the plurality of monitors provides a same field of view to the occupant of cabin as would be experienced by a similarly situated occupant through a window positioned in a lateral spaced-apart relationship along a longitudinal length of the vehicle.

9. The apparatus of claim 8, wherein the plurality of video monitors are positioned in lateral proximity to the occupant.

10. The apparatus of claim 8, wherein each image has a vertical angular field of view equal to the vertical angle subtended by the corresponding monitor from an occupants' eye position.

11. The apparatus of claim 8, wherein the line of sight originates at the occupant's eye position while seated in a position required for taxi, takeoff and landing.

12. The apparatus of claim 8, wherein the occupant's eye position is estimated using sensors monitoring the position of the seat supporting the occupant, wherein the sensors are connected to the computer and provide the occupant location data to the computer.

13. The apparatus of claim 12, wherein the occupant's eye position is estimated using an optical system designed to locate the occupant's head, wherein the optical system is connected to the computer and provides the occupant location data to the computer.

14. The apparatus of claim 8, wherein the suite is designed to seat a pair of occupants side-by-side.

* * * * *